US010832588B2

(12) United States Patent
Akkiraju et al.

(10) Patent No.: US 10,832,588 B2
(45) Date of Patent: *Nov. 10, 2020

(54) COMMUNICATION TONE TRAINING

(71) Applicant: International Business Machines Corporation, Armonk, NY (US)

(72) Inventors: Rama K. Akkiraju, Cupertino, CA (US); Jalal U. Mahmud, San Jose, CA (US); Vibha S. Sinha, Santa Clara, CA (US); Mengdi Zhang, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 79 days.

This patent is subject to a terminal disclaimer.

(21) Appl. No.: 15/810,893

(22) Filed: Nov. 13, 2017

(65) Prior Publication Data

US 2018/0268736 A1     Sep. 20, 2018

Related U.S. Application Data

(63) Continuation of application No. 15/459,561, filed on Mar. 15, 2017.

(51) Int. Cl.
| | |
|---|---|
| *G09B 19/00* | (2006.01) |
| *G09B 5/06* | (2006.01) |
| *G06N 5/04* | (2006.01) |
| *G06N 20/00* | (2019.01) |

(52) U.S. Cl.
CPC ............... *G09B 19/00* (2013.01); *G06N 5/04* (2013.01); *G06N 20/00* (2019.01); *G09B 5/06* (2013.01)

(58) Field of Classification Search
CPC .......... G06N 20/00; G06N 5/04; G09B 19/00; G09B 5/06
See application file for complete search history.

(56) References Cited

U.S. PATENT DOCUMENTS

| | | | | |
|---|---|---|---|---|
| 5,905,972 A | * | 5/1999 | Huang | ..................... G10L 13/08 704/258 |
| 6,173,054 B1 | * | 1/2001 | Beyda | ..................... H04M 1/82 379/372 |
| 6,411,687 B1 | * | 6/2002 | Bohacek | .................. H04M 3/51 379/201.11 |
| 6,668,044 B1 | * | 12/2003 | Schwartz | ........... H04M 3/42221 379/207.01 |
| 6,947,893 B1 | * | 9/2005 | Iwaki | ................. G01C 21/3629 701/441 |

(Continued)

OTHER PUBLICATIONS

Morchid, Mohamed, et al. Theme identification in human-human conversations with features from specific speaker type hidden spaces. Interspeech . 2014.

(Continued)

*Primary Examiner* — Malina D. Blaise

(57) ABSTRACT

An approach is provided that may obtain communication information regarding a communication between a first entity and a second entity while the communication may be ongoing. The communication may include an utterance. A tone associated with the utterance may be identified and may result in an identified tone. An outcome of the communication may be predicted using a machine learning based prediction module and the identified tone.

5 Claims, 4 Drawing Sheets

(56) References Cited

U.S. PATENT DOCUMENTS

| | | | | |
|---|---|---|---|---|
| 7,137,070 | B2* | 11/2006 | Brown | G06Q 30/02 |
| | | | | 715/744 |
| 7,542,902 | B2 | 6/2009 | Scahill et al. | |
| 8,023,636 | B2* | 9/2011 | Koehler | G09B 5/00 |
| | | | | 379/265.04 |
| 8,139,754 | B2* | 3/2012 | Aghara | H04M 3/5175 |
| | | | | 379/265.02 |
| 8,150,021 | B2* | 4/2012 | Geva | H04M 3/51 |
| | | | | 379/265.01 |
| 8,380,794 | B2* | 2/2013 | Chakra | G06Q 10/107 |
| | | | | 709/204 |
| 8,386,252 | B2* | 2/2013 | Michaelis | G09B 19/04 |
| | | | | 704/231 |
| 8,687,776 | B1* | 4/2014 | Reynolds | G06Q 30/02 |
| | | | | 379/88.18 |
| 8,805,759 | B1* | 8/2014 | Cha | G06F 17/00 |
| | | | | 706/45 |
| 9,160,852 | B2* | 10/2015 | Ripa | H04M 3/5133 |
| 9,240,013 | B2* | 1/2016 | Khor | G06Q 30/02 |
| 9,578,060 | B1* | 2/2017 | Brisebois | H04L 63/20 |
| 9,596,349 | B1* | 3/2017 | Hernandez | H04M 3/5175 |
| 9,875,743 | B2* | 1/2018 | Gorodetski | G10L 17/04 |
| 9,984,706 | B2* | 5/2018 | Wein | G10L 25/78 |
| 10,134,401 | B2* | 11/2018 | Ziv | G10L 17/02 |
| 10,303,425 | B2* | 5/2019 | Spiessbach | H04M 3/42221 |
| 2006/0289622 | A1* | 12/2006 | Khor | G06Q 30/02 |
| | | | | 235/375 |
| 2007/0055523 | A1* | 3/2007 | Yang | G09B 19/06 |
| | | | | 704/257 |
| 2008/0107255 | A1* | 5/2008 | Geva | H04M 3/51 |
| | | | | 379/265.06 |
| 2013/0176413 | A1* | 7/2013 | Lowry | H04M 3/5175 |
| | | | | 348/77 |
| 2014/0140497 | A1* | 5/2014 | Ripa | H04M 3/5133 |
| | | | | 379/265.06 |
| 2014/0337072 | A1* | 11/2014 | Tamblyn | G06Q 10/06311 |
| | | | | 705/7.13 |
| 2016/0117684 | A1 | 4/2016 | Khor et al. | |
| 2017/0104875 | A1* | 4/2017 | Im | H04M 3/5191 |
| 2017/0269899 | A1* | 9/2017 | Spiessbach | H04M 3/42221 |
| 2017/0324867 | A1* | 11/2017 | Tamblyn | H04L 51/24 |
| 2019/0018893 | A1* | 1/2019 | Weiss | G06F 16/3344 |

OTHER PUBLICATIONS

Friginal, Eric. "The language of outsourced call centers: A corpus-based study of cross-cultural interaction." vol. 34. John Benjamins Publishing, 2009.

Holman, David, Claire Chissick, and Peter Totterdell. "The effects of performance monitoring on emotional labor and well-being in call centers." Motivation and Emotion 26.1 (2002): 57-81.

Suhm, Bernhard, et al. "A comparative study of speech in the call center: natural language call routing vs. touch-tone menus." Proceedings of the SIGCHI conference on Human Factors in Computing Systems . ACM, 2002.

* cited by examiner

COMMUNICATION TONE TRAINING

BACKGROUND

Sometimes people call a call center to try to resolve an issue. They may be put in communication with an agent. After the phone call, they may have an option to take a survey to provide input about their interaction with the agent and their satisfaction regarding the phone call.

SUMMARY

An approach for providing a communication tone coach is described. Communication information regarding a communication between a first entity and a second entity while the communication is ongoing is obtained. The communication includes an utterance. A tone associated with the utterance is identified, resulting in an identified tone. An outcome of the communication using a machine learning based prediction module and the identified tone is predicted, resulting in a predicted outcome.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein.

DETAILED DESCRIPTION

Figure 1:
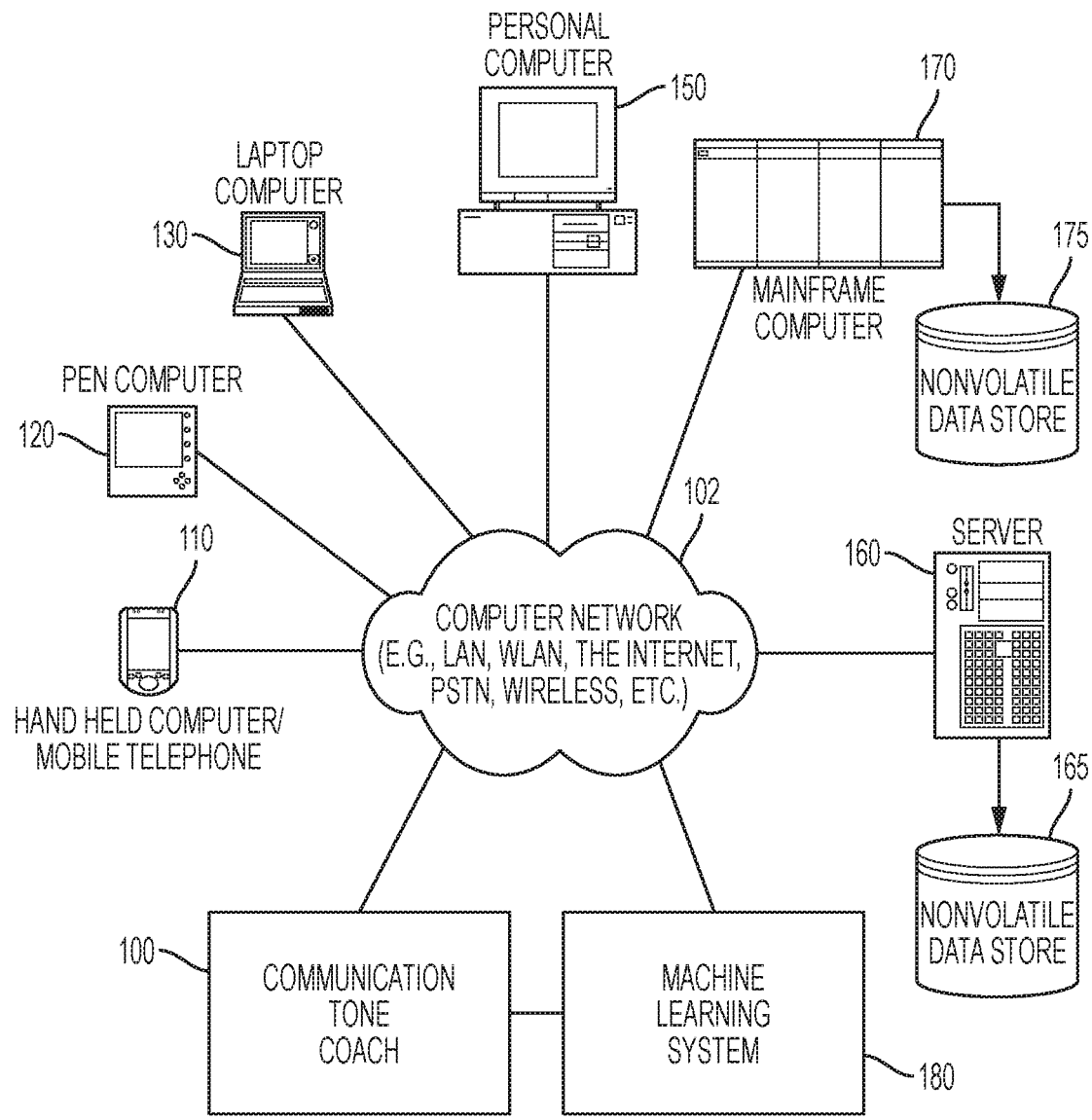
FIG. 1 depicts a schematic diagram of an illustrative embodiment of a communication tone coach in a computer network.

FIGS. 1-4 depict an approach for providing communication tone coaching. The approach may obtain communication information regarding a communication between a first entity and a second entity while the communication may be ongoing. The communication may include an utterance. A tone associated with the utterance may be identified and may result in an identified tone. An outcome of the communication may be predicted using a machine learning based prediction module and the identified tone.

The approach may involve a plurality of different types of tones. Examples of tone types may include social tones and language style tones. Examples of social tones may include friendliness, excitement, modesty, and cheerfulness. Examples of language style tones may include analytical, confident, and tentative.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Embodiments of the present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a communication tone coach 100 coupled to a computer network 102. The communication tone coach 100 may comprise one or more processors and one or more memories, and potentially any other computing device elements generally known in the art including buses, storage devices, communication interfaces, and the like. An example embodiment of a communication tone coach 100 is described in more detail below with reference to FIG. 3. Computer network 102 may include other computing devices in communication with each other and with other devices or components via one or more wired and/or wireless data communication links, where each communication link may comprise one or more of wires, routers, switches, transmitters, receivers, or the like. Communication tone coach 100 and network 102 may provide communication tone coaching. Other embodiments may include communication tone coach 100 interacting with components, systems, sub-systems, and/or devices other than those depicted herein.

The communication tone coach 100 may receive inputs from various sources. For example, the communication tone coach 100 may receive input from the network 102, a corpus of electronic documents or other data, semantic data, and other possible sources of input. In an embodiment, some or all of the inputs to the communication tone coach 100 route through the network 102. The various computing devices on the network 102 may include access points for content creators and content users. Some of the computing devices may include devices for a database storing the corpus of data. Some of the computing devices may include a machine learning system 180 that may be coupled to and receive input from the network 102, the communication tone coach 100, a corpus of electronic documents or other data, semantic data, and other possible sources of input. An example of a machine learning system 180 may include IBM Watson™ system available from International Business Machines Corporation of Armonk, N.Y. The network 102 may include local network connections and remote connections in various embodiments, such that the communication tone coach 100 may operate in environments of any size, including local and global, e.g., the Internet. The machine learning system 180 and the communication tone coach 100 may be communicatively coupled without going through the network 102. The machine learning system 180 may be included in the communication tone coach 100. The various components may directly interact with each other without going through the network 102 and some components may be included within other components.

Types of information handling systems that can utilize a communication tone coach 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an example processor and various components commonly accessed by the processor is shown in FIG. 2.

Figure 2:
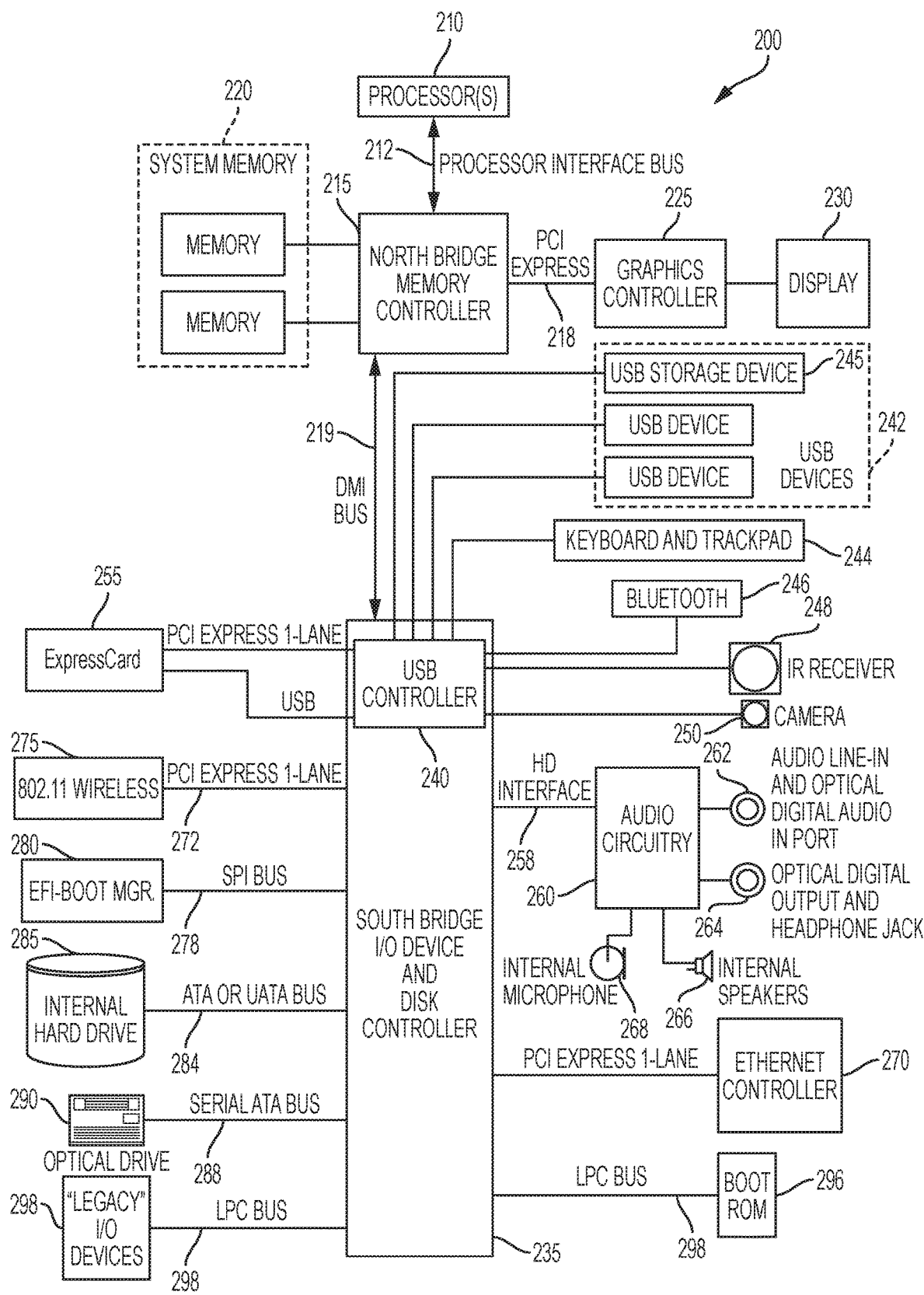
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
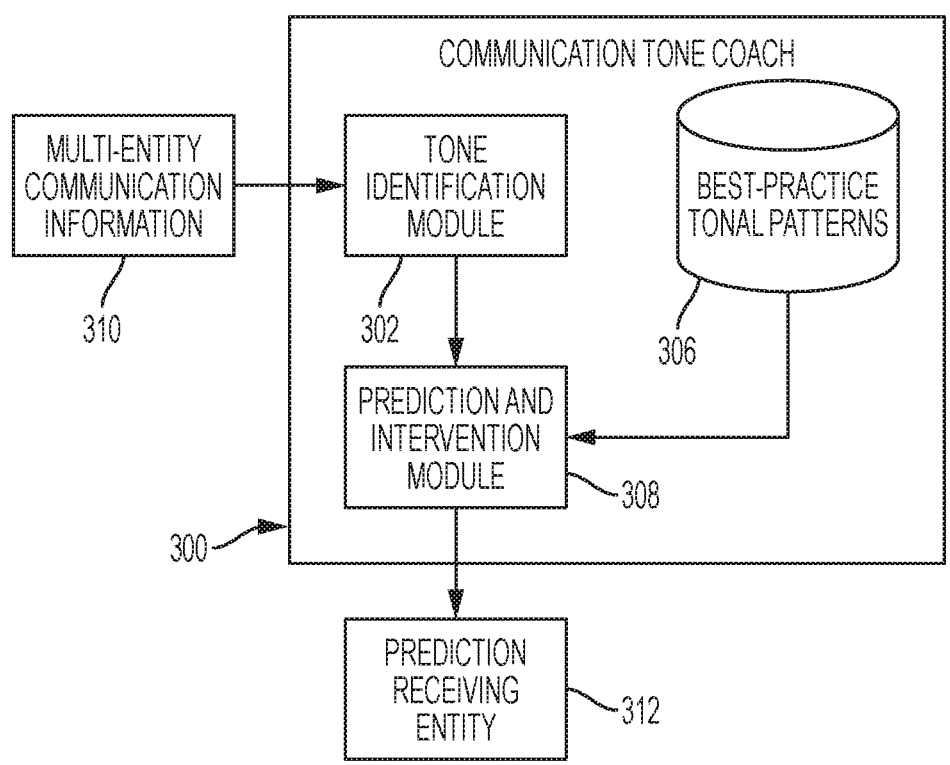
FIG. 3 is an example diagram depicting a communication tone coach in accordance with an illustrative embodiment.

FIG. 3 is an example diagram depicting a communication tone coach 300. The communication tone coach 300 may obtain multi-entity communication information 310. The multi-entity communication information 310 may include information about any type of communication between two or more entities. In an embodiment, the multi-entity communication information 310 may be in a text format. In an embodiment, the multi-entity communication information 310 may be in an audio format. In an embodiment, the multi-entity communication information 310 may be in a combination of text format and audio format.

Entities participating in the multi-entity communication may include any entities capable of communication, for example, human agents, bots, customers, automated digital agents, supervising agents, and the like. In an example embodiment used, a multi-entity communication may be between a human customer and a human agent.

A tone identification module 302 may obtain the multi-entity communication information 310. The multi-entity communication information 310 may include a plurality of utterances. The multi-entity communication information 310 may include a communication transcript such as an email communication or on-line chat communication. The multi-entity communication information 310 may include a communication recording such as a recording of a phone communication. The multi-entity communication information 310 may include any combination of communication transcripts and communication recordings.

If the tone identification module 302 obtains a communication transcript, the tone identification module 302 may process the communication transcript using a text-based tone identifying module to identify tones. The text-based tone identifying module may annotate the multi-entity communication information 310 with tones associated with the utterances.

If the processing module 302 obtains a communication recording, the tone identification module 302 may process the communication recording using a speech-based tone identifying module to identify tones. The speech-based tone identifying module may annotate the multi-entity communication information 310 with tones associated with the utterances.

Examples of tones include: eagerness to help, professionalism, courtesy, active-listening, knowledge-level, closure, confidence, tentativeness, grammar, clarity of expression, frustration, persuasion, sarcasm, cheerfulness, sadness, anger, disgust, etc. In an embodiment, some of the tones are specific to an agent such as, for example, eagerness to help and active-listening.

Processing the multi-entity communication information 310 may include processing semantic data. Semantic data may be content based on the relation between signifiers, such as words, phrases, signs, and symbols, and what they stand for, their denotation, or connotation. In other words, semantic data may be content that interprets an expression, such as by using Natural Language Processing (NLP).

The tone identification module 302 may identify tones using a rule based approach. A rule based approach may have rules to check for matching words/phrases in a pre-created corpus. The rules can also look for context around words/phrases, semantic relatedness, etc.

The tone identification module 302 may identify tones using a machine learning based approach. A machine learning based approach may include collecting a ground truth corpus for each tone and building a machine learning model and storing the model in a repository. The model can be used to detect tones from communications.

An embodiment using a machine learning based approach may use an IBM Watson™ system, which may be augmented with the mechanisms of the illustrative embodiments described hereafter. The IBM Watson™ system may receive the multi-entity communication information 310 which it may parse to extract the tones. The IBM Watson™ system may use various reasoning algorithms to create a prediction model.

The tone identification module 302 may use a hybrid rules based approach and machine learning based approach. The tone identification module 302 may be used during a real-time contact center communication.

The tone identification module 302 may obtain information from social media data sources, enterprise data sources, and other data sources to use for the tone identification. An example of a social media data source may include a public social media account such as, for example, Twitter, Facebook, or Instagram. An example of an enterprise data source may include nonpublic enterprise data sources such as a call center log file or an email account. An example of other data sources may include an anonymized file from another company that has been tokenized and cleaned.

The tone identification module 302 may analyze utterances of the multi-entity communication information 310 and tag the utterances with tones. As the communication progresses, the tags may indicate a pattern of the communication including various tones of the communication turns to describe an evolution of the communication. For example, a first communication turn may include a communication by a first entity, and a second communication turn may include a communication by a second entity. Analysis of various tones during each communication turn may provide a context of the overall communication and how the communication may be progressing. Thus, the overall tonal patterns may be analyzed in context and not just on a sentence-by-sentence or time-based level. The communication turns may allow the interplay between a first entity and a second entity to be considered when determining whether a flag should be raised.

A best-practice tonal patterns repository 306 may include and manage a variety of best-practice tonal patterns. The tonal patterns may be based on detected tones and communication turns for a period of time. For an example, a best-practice tonal pattern may include an agent tone to include a "greeting" and an "eagerness to help" at the beginning of a communication. Another example of a best-practice tonal pattern may include an agent communicating a tone of calmness, composure, assurance, confidence, and knowledgeability in response to a customer venting a frustration. The tone identification module 302 may analyze the evolution of the communication and provide annotation as to whether the evolution adheres to or violates the best practice patterns.

A prediction and intervention module 308 may include a prediction model. The prediction model may be machine learning based and built using ground truth of successful and unsuccessful calls. In an embodiment, a support vector machine algorithm may be used to build the prediction model. The prediction and intervention module 308 may be used to predict an outcome of a communication based on tones in each turn of the communication. For example, a tone of "cheerfulness" may yield a variety of features such as customer-cheerfulness, agent-cheerfulness, customer-cheerfulness-first-half (i.e., computed from a first half of the communication), etc.

The prediction and intervention module 308 may obtain the pattern of the communication from the tone identification module 302 and a best-practice tonal pattern from the best-practice tonal pattern repository 306. The prediction and intervention module 308 may determine whether the pattern of communication adheres to a best-practice tonal pattern.

For example, a customer may call a human agent and during the communication, the customer may say "You have no idea what you're talking about!" The tones that may be associated with that comment may include anger, impatience and frustration. A best-practice response to that type of comment may be for the human agent to apologize to attempt to help calm down the customer. If the human agent instead communicates using a defensive tone that may escalate negative emotions of the customer, then the prediction and intervention module 308 may determine that the communication fails to adhere to a best-practice tonal pattern and the communication may be flagged.

If the communication is flagged, the prediction and intervention module 308 may determine an appropriate intervention plan. Examples of interventions that may be included in an intervention plan when any flags are raised include determining that the call should be re-routed to another entity; determining opportunities for training after the communication; offering tone choice coaching during the communication; and careful monitoring of the continued communication. An example of re-routing the call to another entity includes re-routing the call from one agent to another, such as for example, from a robot/computer to a human agent. Tone choice coaching during the communication may include real-time feedback that can be provided to alert/ suggest that the tone should be modified. An intervention plan may include multiple types of interventions. An intervention plan may be provided to a prediction receiving entity 312.

In an embodiment, the prediction receiving entity 312 may include a supervising entity such as a call center manager. The call center manager may intervene and the intervention plan may be applied. The prediction receiving entity 312 may develop, inform, refine, and/or implement intervention plans.

The prediction and intervention module 308 may determine whether any tone is inappropriate in context. If it is determined that a tone is inappropriate, then the communication may be flagged. If the communication is flagged, the prediction and intervention module 308 may determine an appropriate intervention plan.

The prediction and intervention module 308 may predict whether the outcome of the communication may be positive or negative. If the predicted outcome is deemed to be positive, then the prediction and intervention module 308 may continue to monitor the communication. If the predicted outcome is deemed to be positive, then no action may be immediately necessary.

A prediction receiving entity 312 may obtain information regarding a prediction of the outcome of the communication and any recommended intervention plans. The prediction receiving entity 312 may include a supervising entity. If a communication is flagged, the prediction receiving entity 312 may have the communication brought to its attention. A dashboard may be used to alert a call center manager when the prediction and intervention module 308 outputs a prediction score below a certain threshold, i.e., when a call is likely to be unsuccessful based on the communication so far.

If the predicted outcome is determined to be negative, the prediction and intervention module 308 may determine an appropriate intervention plan. An intervention plan may include determining that the call should be re-routed to another entity. The intervention plan may include determining opportunities for training after the communication. An intervention plan may include offering tone choice coaching during the communication.

Figure 4:
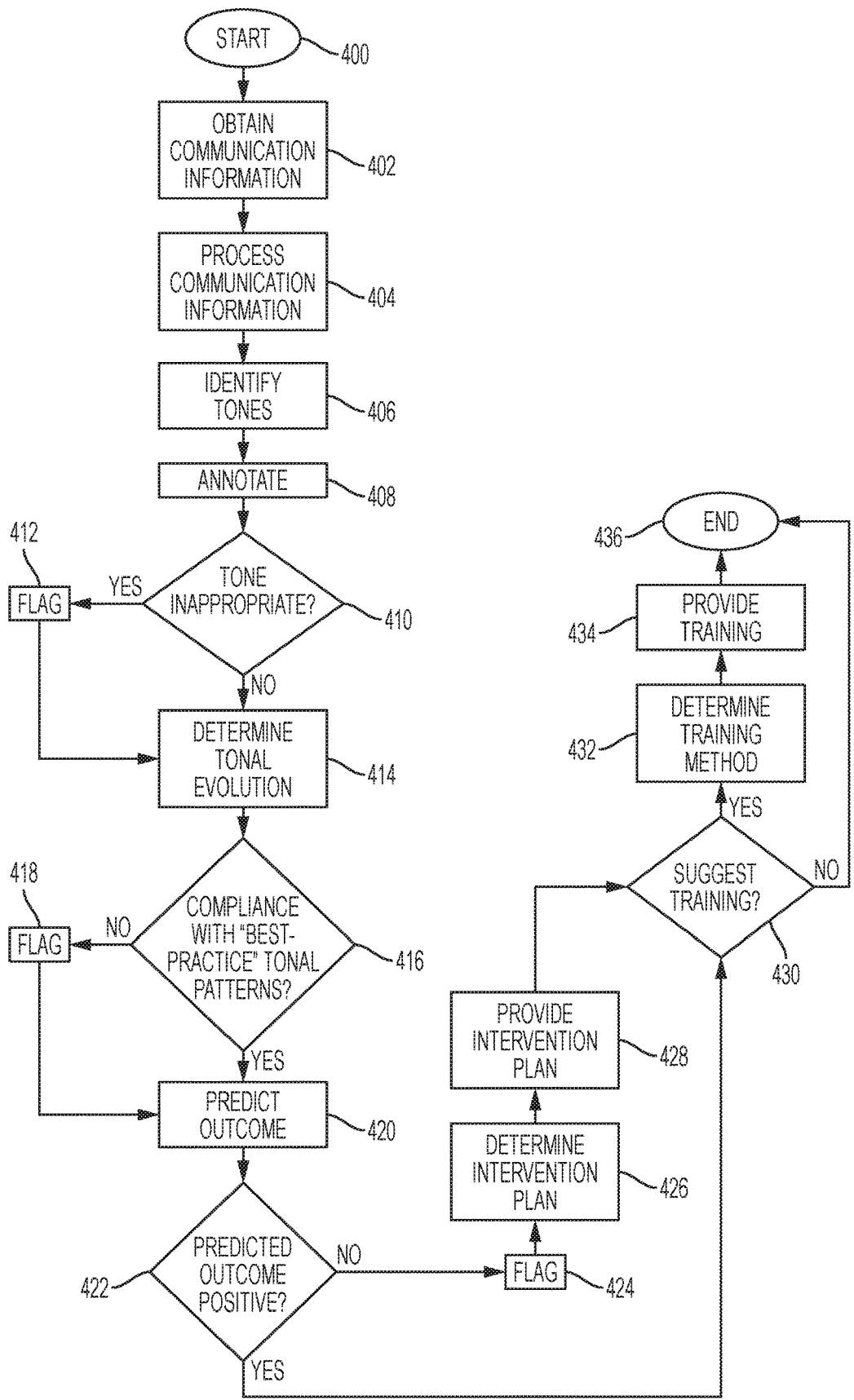
FIG. 4 is an example flowchart outlining an example communication tone coach in accordance with an illustrative embodiment.

FIG. 4 is an example flowchart that illustrates a process for providing a communication tone coach. The process commences at 400 and shows steps that may be taken to provide communication tone coaching. At step 402, multi-entity communication information may be obtained. The multi-entity communication information may include communication information that may be textual, audio, or a combination that includes textual and audio. The entities may include human entities, nonhuman entities, or a combination of human and nonhuman entities. The multi-entity communication may be ongoing. The multi-entity communication may be completed.

At step 404, the communication information may be processed. If the communication information includes a speech recording, it may be processed using speech processing techniques. If the communication information includes textual information, it may be processed using written language processing techniques. The communication information may be processed using Natural Language Processing (NLP).

At step 406, various tones associated with various utterances of the communication may be identified. Tones conveyed by all parties in the communication may be identified. Examples of tones include: eagerness to help, professionalism, courtesy, active-listening, knowledge-level, closure, confidence, tentativeness, grammar, clarity of expression, frustration, persuasion, sarcasm, cheerfulness, sadness, anger, disgust, etc. In an embodiment, some of the tones are specific to an agent such as, for example, eagerness to help and active-listening.

At step 408, the communication information may be annotated to include tags associating tones with utterances of the communication. As the communication progresses, additional tones associated with additional utterances may be identified and the communication information may be annotated to indicate an evolution of the communication. The communication information may be annotated to include tags that indicate a pattern of the communication, including tones associated with the communication turns, to describe an evolution of the communication.

At step 410, it is determined whether a tone is inappropriate. A tone may be determined to be inappropriate for a context of the communication. For example, if an agent at a call center is using an angry tone, the tone may be determined to be inappropriate, because anger may not be considered an appropriate tone in the context of a communication from an agent at a call center. On the other hand, if a customer calling into a call center is using an angry tone, the tone may be determined to be appropriate, because anger may be considered an appropriate tone in the context of a communication from a customer at a call center, because a customer may be expected to be angry about an issue that they are calling the call center about. If a tone is deemed inappropriate, the method continues to step 412 where a flag is raised. If a flag is raised an intervention plan may be determined. After the flag is raised, or if at step 410 it is determined that the tone fails to be inappropriate, the method may continue to step 414.

At step 414, a tonal evolution may be may be determined. The tonal evolution may be determined by analyzing a pattern of the tags associating tones with utterances of the communication over a duration of time. At step 416 it may be determined whether the tonal evolution adheres to best practice tonal patterns. The best practice tonal patterns may be located in a best-practice tonal patterns repository. If it is found that the tonal evolution fails to adhere to the best practice tonal patterns, then at step 418 a flag may be raised. An example of a tonal evolution adhering to the best practice tonal patterns may include an agent effectively addressing a customer's issue and even though the customer used an angry tone at the beginning of the communication, the customer's angry tone is reduced later in the communication because the agent effectively addressed the customer's issue. On the other hand, an example of a tonal evolution that fails to adhere to the best practice tonal patterns may include an agent failing to effectively address the customer's issue, and the customer's angry tone fails to be reduced later in the communication.

If a flag is raised at step 418 an intervention plan may be determined. After the flag is raised, or if at step 416 it is determined that the tonal evolution adheres to the best practice tonal patterns, the method may continue to step 420.

At step 420, an outcome may be predicted, resulting in a predicted outcome. The predicted outcome may be predicted at each turn in the communication using the identified tones and a prediction model. The prediction model may be included in a prediction and intervention module. A best-practice tonal patterns repository may be used to predict the outcome. The predicted outcome may include an outcome as predicted at that point in the communication. The predicted outcome may change throughout the communication as the communication evolves.

At step 422, it is determined whether the predicted outcome is positive. If it is determined that the predicted outcome fails to be positive, then a flag may be raised. If an output prediction score is determined to be below a certain threshold, then a predicted outcome of the communication may fail to be positive.

If a flag is raised an intervention plan may be determined at step 426. At step 428, the intervention plan may be provided. In an embodiment, the intervention plan may be provided via a dashboard that alerts a call center supervisor when a communication is flagged. In an embodiment, the call center supervisor may assist with the intervention plan. The intervention plan may include a plurality of interventions that can be applied in an attempt to improve the outcome of the communication.

If the predicted outcome is deemed to be positive at step 422 or if an intervention plan has been provided at step 428, the method may continue to step 430. At step 430 it may be determined whether additional training should be suggested. If it is determined that additional training should not be suggested and that the communication has ended, then the method may end at step 436.

The determination as to whether additional training should be suggested may occur during the communication. The determination as to whether additional training should be suggested may occur after the communication has ended. The determining as to whether additional training should be suggested may include analyzing any flags that were raised during the communication.

If it is determined at step 430 that training should be suggested, then the method may progress to step 432 to determine the training method. The training may include updating the prediction model to include information learned from the communication. Tonal patterns from the communication may be used for the training method. Identified tones may be used for the training method.

At step 434 the training may be provided. The training may train a person to improve their communication tones in the future. The training may be used to train a bot or an automated agent. The training may include updating the best-practice tonal patterns repository 306. The training may include anything that can be done to improve future results from future communications.

If the communication has ended and either the training has been provided at step 434 or if it was determined at step 430 that training does not need to be suggested, then the method may end at step 436.

Embodiments of the approach may be used in a contact center domain. A contact center supervisor may continuously monitor the calls in their contact centers and be alerted about the ones that aren't progressing as anticipated. This gives contact center managers the ability to intervene in the communications that need attention for achieving a desired outcome and can improve their customer satisfaction metric. Contact center supervisors may also get feedback about the tones used by their agents and help them identify opportunities for training and coaching to improve their customer service. A real-time monitoring and prediction capability of a high percentage of calls also eliminates biases that get introduced by analyzing only a sample set of calls.

Embodiments of the approach may include a human and bot communication. The communication tone coach can provide guidance to communication designers to refine their dialog flows. For example, at step 434.

Embodiments of the approach may be used to provide guidance to various parties involved in a multi-entity communication that may be carried out remotely. Embodiments of the approach may include a completely automated machine learning prediction model to identify various tones as opposed to a word/dictionary-based look up approach. Additionally, embodiments of the approach may analyze communications turns by taking the context and evaluation of previous turns into account in predicting the outcome of the call.

Embodiments of the approach may provide actionable information at a call level that can be acted on during the call. Embodiments of the approach may provide actionable information that may be acted on after the call by identifying opportunities to improve a call center experience for future communications. Embodiments of the intervention plan may include providing a recommended tone for the next communication turn and may include some sample sentences that can be used. Embodiments of the intervention plan may be specific to the communication evolution.

In an embodiment, an interplay between a customer and an agent may play an important role in raising flags, for example who says what and when. This may allow an entire communication context to be considered rather than just each utterance out of context. This context may allow more robustness and provide a more informative depiction of the communication than a sentence-by-sentence or time-based approach.

In an embodiment, a lack of professionalism, active-listening, and confidence in an agent communication may be flagged to indicate that i) the agent may need further training on etiquette and ii) a more experienced agent may need to be deployed to handle the communication. In an embodiment, if a customer repeats a question multiple times, it may be determined that there is a lack of active-listening on part of the agent and may be addressed in a training session.

Embodiments of the approach may raise a flag when the predicted outcome is negative and the tonal pattern fails to adhere to a best-practice tonal pattern. Embodiments of the approach may include a completely automated machine learning prediction model to identify various tones as opposed to word dictionary based lookup. Embodiments of the approach may analyze communication turns by taking context into account and analyzing previous turns to predict the outcome of the call.

Embodiments of the approach take tonal evolution and tonal patterns into account. For example, in a first turn an expected agent tone may be a "greeting" and an "eagerness to help," and an expected customer response may be "venting." Thus, even though the customer response of "venting" may be considered negative, there may no need to raise a flag at this point. If at the next turn the agent's tone is "defensive" and "argumentative," if an expected (i.e., best-practice) response at that turn is "calm" and "assurance" that the customer's problem can be solved, then the agent's tone may be found to violate a best-practice pattern and a flag may be raised to indicate that the communication is likely headed in the wrong direction and the predicted outcome is negative.

Embodiments of the approach may improve an information handling system by providing communication tone coaching. While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
   obtaining, by a communication tone training monitor using machine-learning that includes at least one processor, communication information regarding a communication between a first entity and a second entity while the communication is ongoing, wherein the communication includes an utterance;
   parsing, by the communication tone training monitor, the communication information to extract a tone associated with the utterance, resulting in an identified tone in a dialog flow, wherein the dialog flow includes a plurality of identified tones and communication turns for a period of time that describe a tonal evolution of the communication between the first entity and the second entity resulting in a tonal pattern of the communication that may be analyzed in context;
   predicting, by the communication tone training monitor, an outcome of the communication by accessing a tonal patterns repository and determining whether the tonal pattern of the communication complies with a best-practice tonal pattern from the tonal patterns repository, wherein the tonal patterns repository is operatively coupled to a plurality of entities, and wherein the tonal patterns repository includes a plurality of best-practice tonal patterns based on tones and communication turns for a period of time, resulting in a prediction score;
   determining whether the prediction score is below a threshold;
   when the prediction score is below the threshold, flagging the communication;
   when the prediction score is below the threshold, determining an intervention plan intended to increase the prediction score and outputting the intervention plan;
   using, by the communication tone training monitor, the prediction score to determine guidance regarding tonal choice to the second entity for the next turn of communication, wherein the tonal choice is selected from one of the detected tones from one of the best-practice tonal patterns in the tonal patterns repository; and
   outputting the guidance to a display.

2. The method of claim 1, wherein the prediction score is below a threshold, further comprising:
   providing a sample sentence to the second entity to use for a next turn of communication;
   outputting an alert that assistance is needed;
   annotating the communication information to associate the identified tone with the utterance and to indicate that the dialog flow fails to comply with any of the best-practice tonal patterns in the tonal patterns repository, resulting in annotated communication information; and
   providing the annotated communication information for updating the tonal patterns repository.

3. The method of claim 1, further comprising:
   identifying additional tones associated with additional utterances, resulting in additional identified tones in the dialog flow;
   annotating the communication information to associate the additional identified tones with the additional utterances to indicate a tonal evolution of the communication;
   determining whether the tonal evolution of the communication complies with any of the best-practice tonal patterns in the tonal patterns repository; and
   if it is determined that the tonal evolution of the communication fails to comply with any of the best-practice tonal patterns in the tonal patterns repository, flagging the communication.

4. The method of claim 1, further comprising:
   determining whether the identified tone is inappropriate for a context of the communication; and
   if it is determined that the identified tone is inappropriate, flagging the communication.

5. The method of claim 1, further comprising:
   suggesting training to improve a future communication.

* * * * *